R. F. OVERLOCK AND L. B. DUNTLEY.
WASHING MACHINE.
APPLICATION FILED DEC. 15, 1921.

1,430,749.

Patented Oct. 3, 1922.
3 SHEETS—SHEET 1.

INVENTORS:
R. F. OVERLOCK.
L. B. DUNTLEY.
BY Whiteley and Ruckman
ATTORNEYS.

R. F. OVERLOCK AND L. B. DUNTLEY.
WASHING MACHINE.
APPLICATION FILED DEC. 15, 1921.

1,430,749.

Patented Oct. 3, 1922.
3 SHEETS—SHEET 2.

INVENTORS
R. F. OVERLOCK.
L. B. DUNTLEY.
By Whiteley and Ruckman
ATTORNEYS.

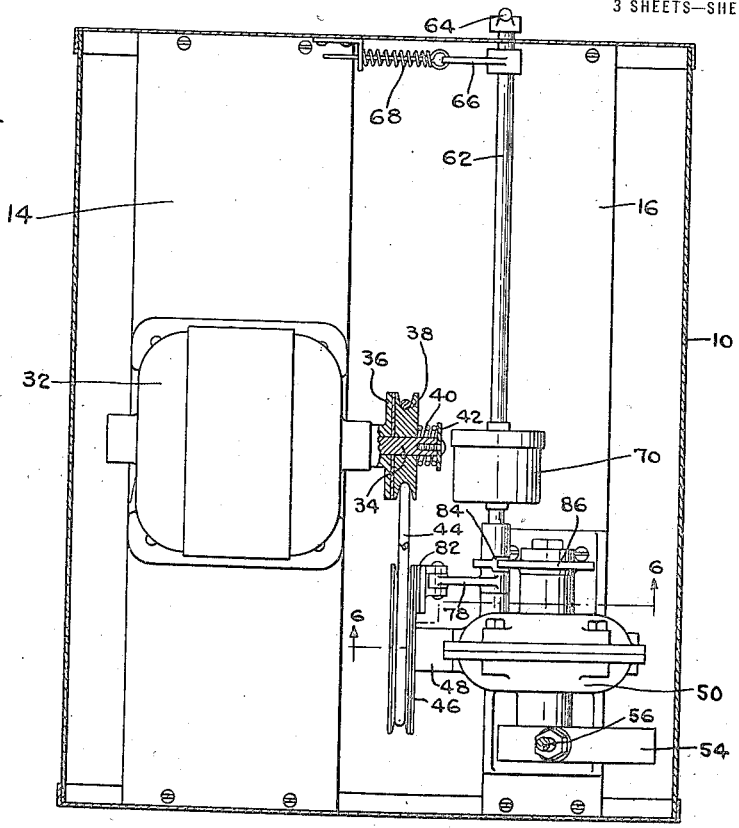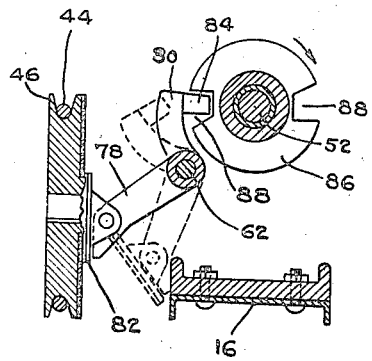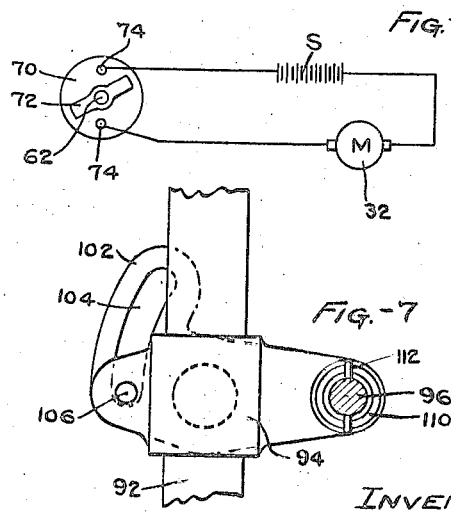

Patented Oct. 3, 1922.

1,430,749

UNITED STATES PATENT OFFICE.

RUSSELL F. OVERLOCK AND LLOYD B. DUNTLEY, OF MINNEAPOLIS, MINNESOTA.

WASHING MACHINE.

Application filed December 15, 1921. Serial No. 522,465.

*To all whom it may concern:*

Be it known that we, RUSSELL F. OVERLOCK and LLOYD B. DUNTLEY, citizens of the United States, residing at Minneapolis, in the county of Hennepin and State of Minnesota, have invented certain new and useful Improvements in Washing Machines, of which the following is a specification.

Our invention relates to washing machines. An object is to provide a power operated oscillatory receptacle in combination with means for stopping the movement of the receptacle so that it will always come to rest in a predetermined position. While our machine is intended more particularly for washing clothes, it will be obvious that it may be conveniently used for other purposes.

The full objects and advantages of our invention will appear in connection with the detailed description, and the novel features embodied in our inventive idea will be particularly pointed out in the claim.

Figure 1:
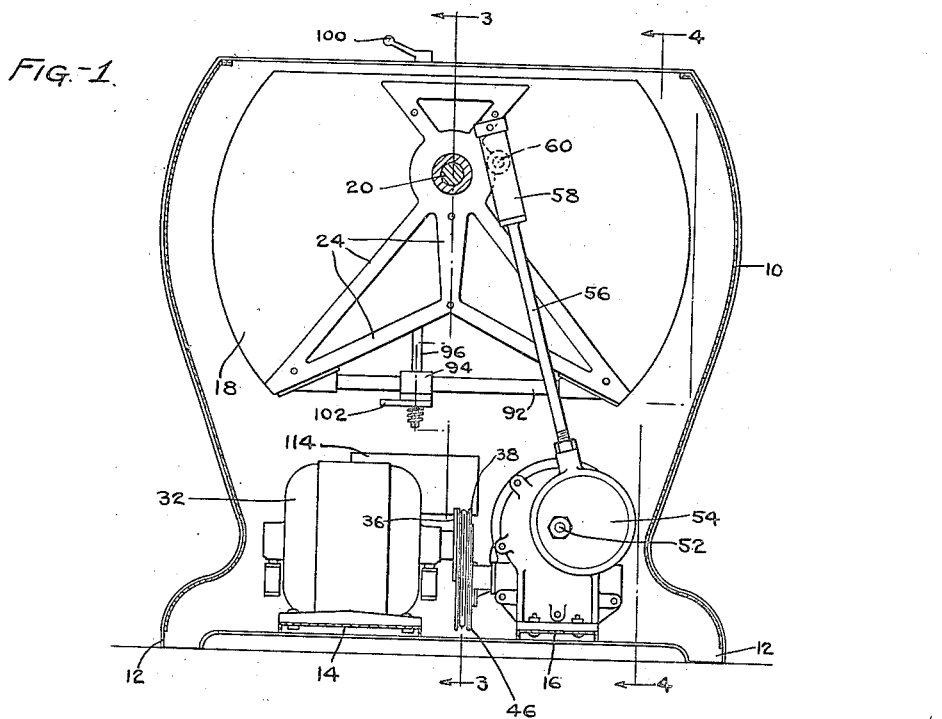
Figure 2:
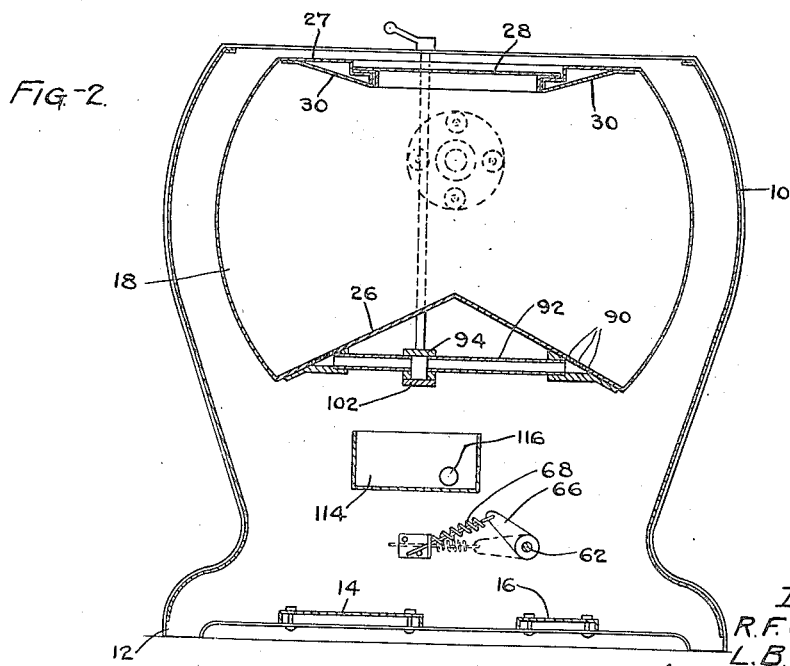
Figure 3:
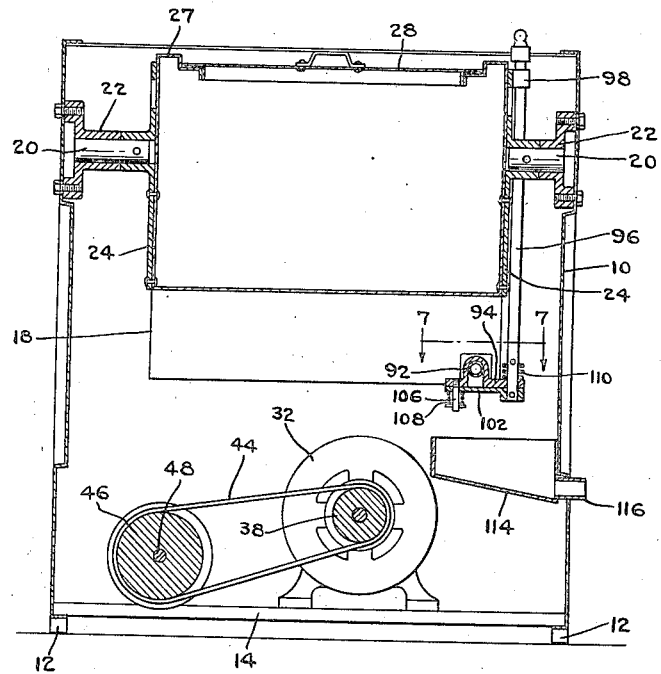
Figure 4:
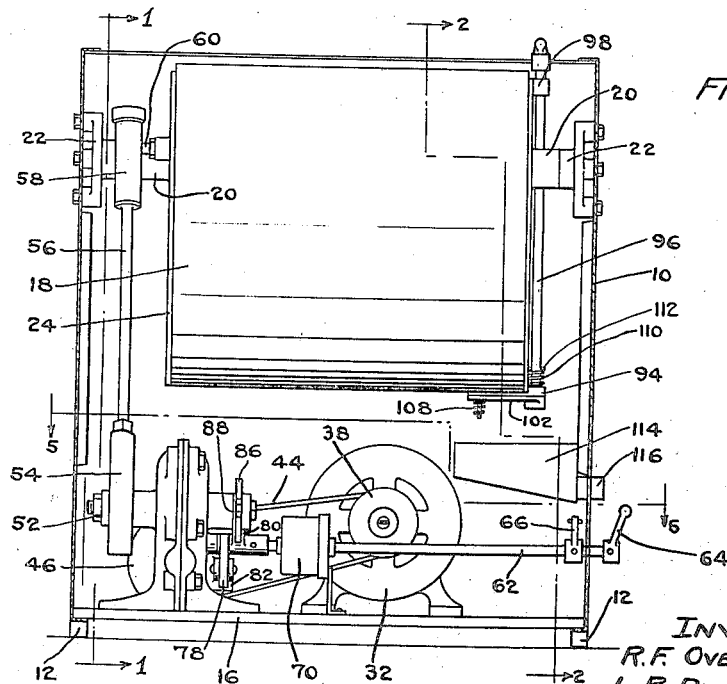

In the accompanying drawings which illustrate the application of our invention in one form, Fig. 1 is a view of the machine in vertical section on the line 1—1 of Fig. 4. Fig. 2 is a vertical section on the line 2—2 of Fig. 4. Fig. 3 is a vertical section on the line 3—3 of Fig. 1. Fig. 4 is a vertical section on the line 4—4 of Fig. 1. Fig. 5 is a horizontal section on the line 5—5 of Fig. 4. Fig. 6 is a detail view of the brake mechanism on the line 6—6 of Fig. 5. Fig. 7 is a view in section on the line 7—7 of Fig. 3. Fig. 8 is a view illustrating a wiring diagram.

Referring to the construction shown in the drawings, the numeral 10 designates the frame of the machine. This frame is in the form of a housing open at top and bottom, the bottom being provided with feet 12 on its four corners, and also being provided with two bars or supports 14 and 16 which extend horizontally across the housing slightly above the lower ends of the feet 12. A receptacle 18 is provided on its opposite ends with trunnions 20 by means of which it is oscillatingly mounted in bearings 22 carried by the housing. The receptacle 18 is preferably made of sheet metal and provided at its ends with reinforcing ribs 24 which serve for attachment of the trunnions 20. The ends of the receptacle to which these trunnions are attached are flat while the front and rear sides of the receptacle are curved on arcs so as to be substantially concentrically spaced within the adjacent walls of the housing as best shown in Fig. 2. The bottom 26 of the receptacle inclines from both sides upwardly toward the middle so as to be of inverted V-shape in cross section. The top of the receptacle includes a flat frame 27, the inner margin of which is depressed to receive a cover 28. The outer margins of the frame 27 lying adjacent the curved walls of the receptacle are connected to the lower sides of the depressed inner margin of this frame by inclined strips 30, the inclination of which is oppositely directed from that of the bottom members of the receptacle. The result of this construction is that when the receptacle is oscillated, the water or other liquid contained therein is caused to be thrown around somewhat in figure 8 form. Mounted upon the support 14 is an electric motor 32 having a shaft 34 to which is secured a disk 36. A pulley 38 is loosely mounted on the motor shaft and is held in vertical engagement with the disk 36 by a spring 40 interposed between the face of the pulley and a disk 42 secured to the end of the motor shaft as shown in Fig. 5. A belt 44 runs around the pulley 38 and around a pulley 46 secured to a shaft 48 which is mounted in bearings, formed upon a gear casing 50. Within this casing there is a gearing such as a worm gearing by means of which the rotation of the pulley 46 and the shaft 48 causes rotation of a shaft 52 mounted in this casing at right angles to the shaft 48. Secured to one end of the shaft 52 is an eccentric 54 which operates a pitman rod 56, the upper end of which carries a connecting member 58 which engages with a pin 60 extending out from one end of the receptacle 18 whereby the latter is caused to oscillate when the motor is operated. A rod 62 extends through one side of the housing 10 and at its inner end is journaled in the gear casing 50. A handle 64 for rocking the rod 62 is secured to the outer end thereof. Also secured to the rod 62 is an arm 66 to the free end of which a compression spring 68 is attached, and this spring acts to hold the rod and the arm 66 in either the position shown in dotted lines or full lines in Fig. 2 when the rod is partly rotated by means of the handle 64. The rod 62 extends through a switch housing 70 containing a switch so that when the rod and the arm 66 are in the position shown in full lines in Fig. 2, the switch will be opened, and when in the position shown in dotted lines, the switch will be closed. The switch may be of any suitable construction such as that shown in Fig. 8 in which the housing 70 contains a bridging arm 72 insulatively mounted on the rod 62 and adapted when this rod is turned in one direction to bridge across contact posts 74 and 76 connected in circuit with the motor 32 and with a suitable source of electric energy indicated at S. Secured to the inner end of the rod 62 are two arms 78 and 80 disposed angularly with relation to each other. Secured to the free end of the arm 78 is a brake 82 which, in the position of the rod 62, corresponding to that in which the switch is opened, is adapted to engage the face of the pulley 46 as shown in full lines in Fig. 6 and which, in the other position of the rod, is removed from engagement with the pulley as indicated in dotted lines. The arm 80 is provided with a projection 84 arranged to cooperate with a disk 86 secured to the inner end of the shaft 52. This disk is provided with two diametrically opposite notches 88 adapted to receive the projection 84 so that the brake can be applied only when the projection enters one of these notches. The purpose of this arrangement is to cause the receptacle to always stop in a predetermined position which ordinarily would be the level position unless for some special purpose another position might be considered desirable. By providing two notches in the disk 86, the receptacle will be stopped in the desired position regardless of whether its oscillatory movement at the particular time is toward the right or toward the left. In order that the receptacle may be readily emptied or drained, we provide the following device. The bottom of the receptacle is provided with an outlet consisting of a plurality of small openings 90 which lead into a horizontal tube 92 secured under the receptacle. This tube contains a gap which is closed by a casting 94 secured to the portions of the tube adjacent the gap. This casting is hollow so as to communicate with the tube 92 and has an opening in the bottom of the chamber contained therein which can be opened and closed. The casting 94 is extended to form a bearing for the lower end of a rod 96 whose upper end is mounted in a bearing 98 secured to the receptacle 18, and this end of the rod is provided with a handle 100 by means of which it may be rocked. Secured to the lower end of the rod 96 is a plate 102, the free end of which is widened and provided with a slot 104 which cooperates with a pin 106 extending downwardly from the casting 94. This pin limits the movement of the plate 102 so that when the latter is in one position, the opening in the lower side of the chambered casting 94 is closed and when in another position, it is opened. The plate 102 at one end is held closely against the lower side of the casting 94 by a spring 108 placed between the plate and an enlargement on the lower end of the pin 106. The plate at its other end is held closely against the side of the casting by a spring 110 placed between the upper side of the casting 94 and a pin or projection 112 carried by the rod 96. When the plate 102 is moved into open position, the liquid is discharged into a pan 114 secured to the housing 10 and having a discharge tube 116.

The operation and advantages of our invention will be readily understood in connection with the foregoing description. When the device is to be used for washing clothes or for other desired purposes, the rod 62 and the arm 66 are placed in the position shown in dotted lines in Fig. 2. This removes the brake from engagement with the brake pulley and also closes the switch. When it is desired to stop the machine, the rod 62 is stressed toward its other position, and as soon as the disk 86 has rotated sufficiently to bring one of its notches in line with the projection, the brake is brought into engagement with the pulley 46 and the receptacle is stopped in level position or other desired predetermined position according to the manner in which the device is set. The direction in which the disk 86 rotates causes the brake to be applied with sufficient force to instantly stop the movement of the receptacle. As previously explained, the switch is off at this time. On account of the frictional mounting of the driving pulley 38 on the motor shaft, the momentum of the motor gradually checks without straining of the parts. Included in the advantages of our invention are the facts that the machine is strong and durable, quiet and efficient in operation, economical to manufacture, easy to control, of light weight and simple construction, may be made of small size so that it can be placed in a bathtub or may be of large size and mounted in any customary or suitable manner, and the receptacle may be oscillated at a high rate of speed, since the operating mechanism does not contain any jaw clutch or similar device which would tend to limit the speed of operation.

We claim:

A machine of the character described comprising a support, a receptacle adapted to hold liquid and articles to be acted upon by said liquid mounted on said support, means for oscillating said receptacle to cause agitation of the liquid and articles therein, positive means for simultaneously terminating operation of said oscillating means and stopping the oscillation of said receptacle, and means for controlling the time of action of said simultaneously operative means to cause the stopping of said receptacle in a predetermined position.

In testimony whereof we hereunto affix our signatures.

RUSSELL F. OVERLOCK.
LLOYD B. DUNTLEY.